Sept. 21, 1971     L. B. WALKER ET AL     3,606,750

FRUIT HARVESTER

Filed April 11, 1969                     2 Sheets-Sheet 1

INVENTORS
LARRY B. WALKER &
HOWARD LAUCK
BY
Hinderstein & Silber

ATTORNEYS

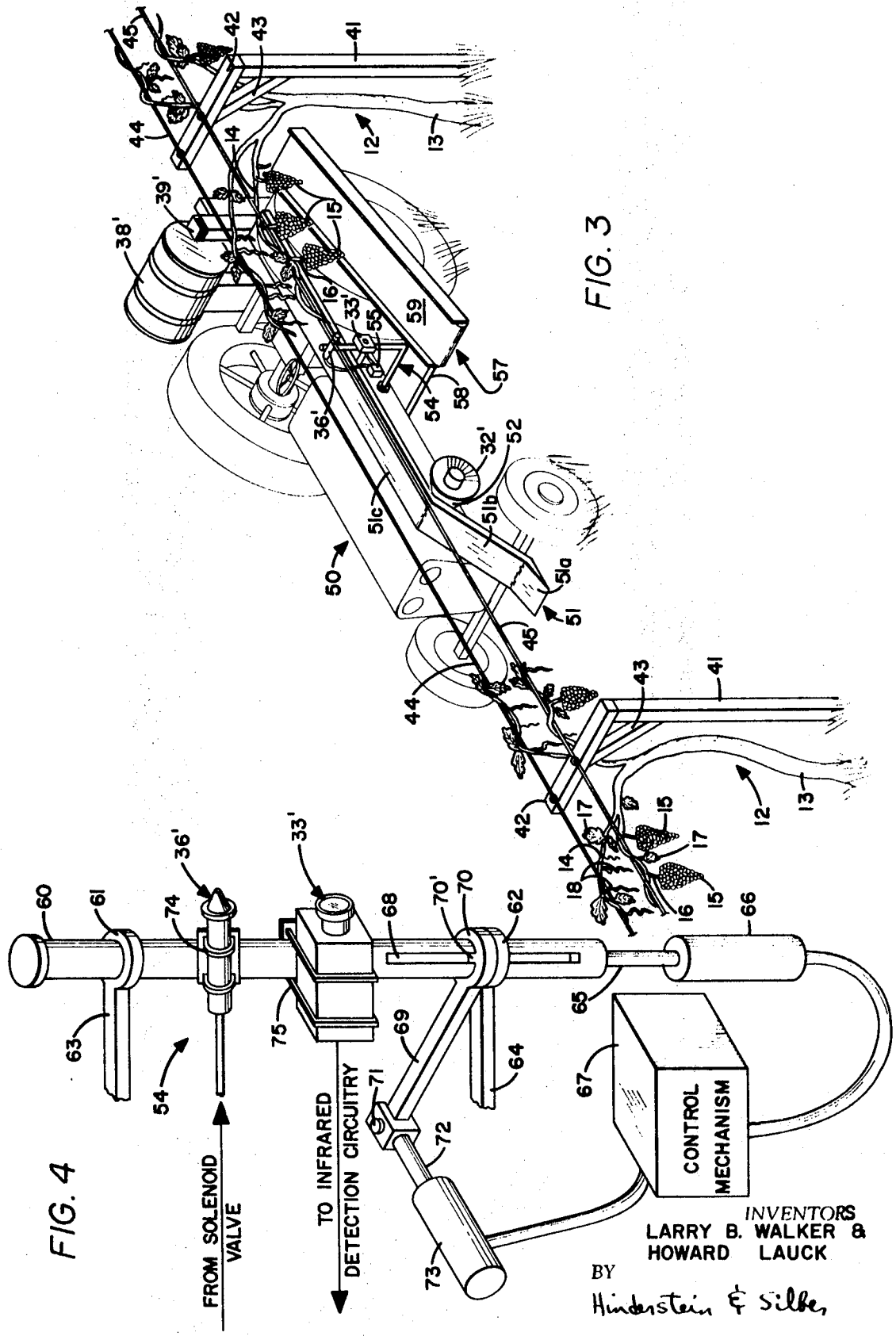

United States Patent Office 3,606,750
Patented Sept. 21, 1971

3,606,750
FRUIT HARVESTER
Larry B. Walker, 1322 Frances Ave., Fullerton, Calif.
92631, and Howard Lauck, 2240 James Downey Road,
Independence, Mo. 64050
Filed Apr. 11, 1969, Ser. No. 815,380
Int. Cl. A01g *19/00*
U.S. Cl. 56—331                                                          26 Claims

ABSTRACT OF THE DISCLOSURE

A harvester for vine or tree borne fruit. An infrared sensor scans the plant and locates the fruit by sensing the different thermal emissivity of the fruit compared with adjacent stem or leaves. A cutter, actuated by the sensor, selectively severs the stem in response to such thermal fruit detection. Preferably, the cutter comprises a fine, high intensity stream of air or water.

In a typical application as a grape harvester, a tractor mounted heater preheats the vines being picked. A thermal sensor and the cutter nozzle, situated on the tractor rearward of the heater, simultaneously are scanned across the preheated vine. When a cluster of grapes is located, as indicated by maximal thermal emissivity, high pressure water from a compressor is supplied to the nozzle via a solenoid valve actuated by the sensor. The resultant cutting stream selectively severs the grape cluster.

BACKGROUND OF THE INVENTION

(1) Field of the invention

The present invention relates to a method and apparatus for harvesting vine or tree borne fruit. More particularly, the invention relates to a system for determining by differential thermal emissivity the location of fruit hanging naturally from a vine or tree, for automatically severing the stem using a high intensity water or air stream cutter, and for retrieving the fruit.

(2) Description of the prior art

Various vine or tree borne fruits long have defied mechanical harvesting. For example, tender, juicy grapes ripening in clusters amid entanglements of vines have been virtually impossible to pick by machine. As a result, in 1968 some 70,000 workers were required in California alone to harvest the 457,000 acres of vineyards in the state. Such hand picking is extremely difficult, the average worker struggling an entire day to harvest approximately 6 tons of grapes.

A number of mechanical grape harvesters have been patented or produced in the past, but all suffer from shortcomings which have prevented their commercial acceptance. Common to all such prior art harvesters is the use of severing mechanisms which are non-selective. That is, the cutting mechanism is not guided to a particular fruit stem which is then severed. Rather, the prior art harvesters either use cutters which sever all fruit at a particular level (e.g. two inches below the trellis wire), or employ a random shaking process for separating fruit from vine. Further, to accomplish acceptable yields with such non-selective severing, the prior art harvesters all required the grapes to be grown on special, non-conventional trellises.

Typical of such prior art harvesters is that described in U.S. Pats. 2,893,194 and 2,929,184 to L. H. Lamouria. This device is adapted for operation with an inverted L-shaped trellis the vertical portions of which comprise the conventional stakes to which the trunks of the grape vines are supported. One or more wires are connected between the raised horizontal trellis portions, so that the trellis wires run parallel to the rows of stakes. The grape canes are trained along the inner trellis wires, the clusters of grapes hanging downward below the vines. The new non-fruit bearing vines or shoots, which will form the canes for the following year's growth, drape down from the outermost of the trellis wires.

In the Lamouria harvester, actual cutting of the grapes from the vine is accomplished by the use of a horizontally disposed rotary chain cutter not unlike a chain saw used to cut trees. The chain cutter is disposed immediately below the trellis wires, and functions to sever indiscriminately all of the stems or vines lying in its path. A curved metal depresser, having a width substantially equal to the width of the trellis system, rides along the top of the trellis wires directly above the cutter. The depresser is used to push the canes and grapes downward, to insure that all the grapes hang below the level of the wires.

To maintain the cutter immediately below the wires, a complicated control system is used wherein the depresser serves a secondary function of sensing the height above the ground of the trellis wires. As this height changes, for example due to sagging between the support stakes, the height of the cutter is correspondingly adjusted, thereby keeping the cutter chain a constant distance below the wires.

Prior art devices of this type are complex mechanically, involving complicated systems for sensing the trellis height and for accordingly compensating the height of the cutter. Secondly, such cutters operate non-preferentially, so that if some grape clusters have not been pushed down sufficiently far below the level of the wires by the depresser, the chain cutter may sever the cluster in half. There is, of course, no discrimination as to whether vine, stem or fruit is being cut. Since inevitably leaves and other vines also will be hanging from the wires, these too will be severed by the chain cutter, necessitating use of a special blower system to separate leaves and other debris from the desired grapes. Further, a complex retraction mechanism must be used to sense the location of the vertical trellis support stakes and to withdraw the chain cutter toward the tractor to insure that the cutter does no sever the stake.

Yet another technique for severing grapes from vines utilizes E. F. Shepardson in U.S. Pat. No. 3,328,944. The Shepardson harvester, an inverted L-shaped trellis system, and employs an umbrella-frame-shaped device to strike the trellis wires. In particular, the striker is suspended immediately below the trellis wires and is vibrated up and down against the wires at approximately 350 to 600 cycles per minute. A paddle-wheel sensor rides along the top of the trellis to determine the above ground wire height, this information in turn being used to maintain the position of the shaker immediately below the wires.

A serious shortcoming of such shaker type grape harvesters is that to accomplish efficient separation of the grapes from the vines, the grapes must be quite ripe, past the optimum time for picking, and almost to the stage of being rotten. Only then are the grapes sufficiently loose on the stem to be felled by an oscillating trellis striker. Thus, the utility of the harvester is limited to applications in which over-ripe grapes are satisfactory. Moreover, the period during which grape picking can be carried out is severely limited.

Another prior art grape harvester of the impactor variety has been sold commercially for use with a "duplex" system of grape vine training developed by the University of California at Davis. Here a pair of horizontal trellis wires, spaced three feet, are suspended from a saddle supported by the stake associated with a vine trunk. The fruit bearing canes are supported by the spaced wires, while the replacement zone, containing the non-fruit bearing vines, lies between and below the spaced wires. The trellis wires are struck from below by a steel rod, the impact dislodging bunches of grapes.

In yet another prior art approach, the harvester shakes the vines vigorously by means of paddles made of flexible silicone base plastic. As a result, individual berries separate from the cluster stem and are caught in a series of buckets.

Thus all of the prior art fruit harvesters require mechanical striking of the vines or trellises, or "mowing" of the vines directly below the trellis wires. In each case, special trellises are required, together with complicated trellis wire followers to position the cutter or shakers. Moreover, in no prior art harvester is there actual selective location of the fruit cluster or stem. Thus, considerable amounts of vine and leaves are cut from the trellis in addition to the grapes, and blowers or other devices must be used to separate grape from debris. Moreover, the beating or mowing techniques tend to damage a considerable portion of the harvested grapes, thus limiting the usefulness of the devices to picking grapes intended for wine or raison use. Such techniques are unsatisfactory for picking table grapes, where the integrity of the grape skin is required to assure the asthetic appearance demanded by the housewife.

These and other shortcomings of the prior art are overcome by using the inventive fruit harvesting system wherein an infrared sensor is used to detect the location of the fruit by its thermal emissivity characteristics, and a high intensity fluid cutter, positioned in response to the sensor means, is used to sever the fruit stems.

SUMMARY OF THE INVENTION

In accordance with the the present invention there is set forth a novel system for harvesting vine or tree borne fruit. The system utilizes the different thermal emissivity characteristics of various portions of a fruit plant to locate the actual fruit, and accordingly to direct a cutting mechanism to sever the stem.

Initially, a conventional heater is used to preheat the plant slightly above ambient temperature. Because of their different water content, various portions of the plant cool at different rates, fruit retaining most heat for a given cooling period, stems retaining slightly less heat, and leaves less heat yet. In terms of infrared radiation or thermal emissivity of the plant, the fruit exhibits the highest emissivity, the stems a lesser emissivity, and the leaves a lower emissivity yet.

An appropriate infrared sensor is used to scan across the previously heated plant. The scanning mechanism also positions a cutting device, so that when fruit is detected (as indicated by a region of maximum sensed thermal emissivity), the cutter may be actuated selectively to sever the stem.

For many fruits, including grapes and other vine borne berries, effective severing of the stem can be accomplished using a fine, high pressure stream of air or water. For example, grape stems can be cut from a distance of two feet or more using a fine stream of water under a minimum pressure of 1200 p.s.i. projected through a nozzle having an orifice diameter of .05 inch or less.

In an illustrative system for picking grapes from a trellis, a tractor is provided with a heater adjacent its forward end. Somewhat rearward of the heater are mounted an infrared sensor and a nozzle for porducing a high intensity cutting stream. The sensor and nozzle are mounted so as to reciprocate in a raster-like fashion across a portion of the grape vine. When the infrared sensor detects the location of a cluster of grapes, a solenoid valve is actuated, feeding high pressure water from a compressor carried on the tractor, through the nozzle. The resultant high intensity stream severs the stem of the cluster and the grapes fall onto a conveyor or other appropriate pickup device.

Thus, it is an object of the present invention to provide a novel method and apparatus for locating vine- or tree-borne fruit.

Another object of the present invention is to provide a fruit harvester wherein the fruit is located by observing its thermal emissivity characteristics relative to the remainder of the plant.

It is another object of the present invention to provide a system for harvesting vine or tree borne fruit wherein the plant initially is heated, then scanned with a thermal sensor to determine fruit location by sensing the regions of maximum heat retention.

Yet another object of the present invention is to provide a fruit harvesting system comprising a cutter directed to the fruit stem in response to the sensed relative thermal retention characteristics of portions of the plant.

It is yet another object of the present invention to provide a novel stem cutting mechanism comprising a narrow, high intensity stream of water or air.

A further object of the present invention is to provide a mechanism for severing fruit from a plant, the mechanism comprising a solid stream nozzle through which is forced air or water under high pressure, the flow being controlled by a solenoid valve.

It is a further object of the present invention to provide a harvesting system comprising means for preheating a plant, means for sensing fruit location by determining the different thermal emissivity characteristics of portions of the plant, and means for positioning a stem cutter in response to the sensed thermal emissivity characteristics.

Still a further object of the present invention is to provide a grape harvesting mechanism including a tractor provided toward the front with a heater and provided toward the rear with an infrared sensor and cutting mechanism.

It is yet a further object of the present invention to provide a grape harvesting mechanism including a tractor having a chute for lifting out of the way the non-fruit-bearing vines, a heater for preheating cane and grape cluster regions, a scanning infrared sensor for locating the grape clusters by determining the regions of maxmium thermal emissivity, a cutter comprising a solid stream nozzle projecting a controlled fine stream of water under greater than 1200 p.s.i. pressure, the stream being directed and controlled in response to the infrared sensor, and appropriate means for retrieving the severed grape clusters.

BRIEF DESCRIPTION OF THE DRAWINGS

Still other objects, features and attendant advantages of the present invention will become apparent to those skilled in the art from a reading of the following detailed description of the preferred embodiments constructed in accordance therewith, taken in conjunction with the accompanying drawings wherein like numerals designate like parts in the several figures and wherein:

FIG. 1b is a somewhat idealized raster type display of an infrared scan of the grape vine, illustrated in FIG. 1a.

FIG. 1c illustrates a typical infrared scan across the grape vine illustrated in FIG. 1a, the scan illustrating the relative thermal emissivity of various portions of the plant.

FIG. 3 is a simplified perpsective view of an embodiment of the inventive fruit harvester mounted on a tractor and adapted for grape picking.

FIG. 4 is a simplified plan view of a typical support and scanning mechanism for the cutter nozzle and infrared sensor components illustrated in FIG. 3.

DESCRIPTION OF THE PREFERRED EMBODIMENTS

Figure 1A:
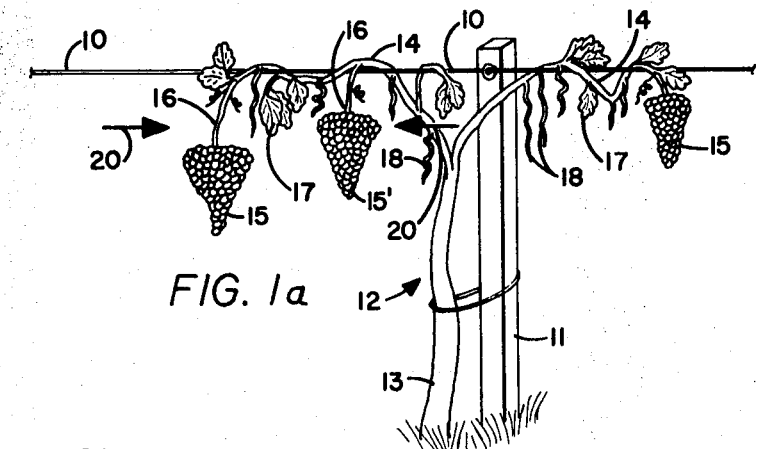
FIG. 1a is a fragmentary elevation view of a typical trellis-supported grape vine, showing several clusters of grapes hanging downward from a horizontal trellis wire.

Referring now to the drawings, and particularly to FIG. 1a thereof, there is shown a somewhat simplified view of a trellis supported grape vine. A trellis wire 10 is suspended horizontally between a plurality of stakes 11 (only one of which is shown) at a typical height of 45 inches above the ground. A grape vine 12 is shown growing adjacent stake 11, the trunk 13 being tied to stake 12 for additional support.

Extending from the upper end of trunk 13 are a plurality of grape canes 14 which, in a manner well known in the grape growing industry, have been trained along trellis wire 10 so as to run somewhat horizontally. A plurality of clusters 15 of grapes depend from cane 14, being connected thereto by stems 16. Some leaves 17 also will grow from canes 14. In addition, extending from the upper end of trunk 13 of grape vine 12 are a plurality of shoots or vines 18 which are non-fruit-bearing, but which will become the fruit bearing canes the following year. In trellises of the type illustrated, the non-fruit-bearing vines 18 typically hang down on both sides of the clusters 15, somewhat obscuring the grapes from view.

In accordance with the present invention, it has been discovered that if the fruit-bearing area of a plant such as grape vine 12 (FIG. 1a) is heated and then permitted to cool, the fruit will retain heat for a relatively long period of time, while the leaves and stems will dissipate heat more quickly. To some degree, this ability to retain heat relates to the amount of water in the portion of the plant. Thus, the fruit typically contains more water than the fibrous leaves, stems or trunk of the plant.

The different capabilities of portions of a fruit-bearing plant to retain heat may also be considered in terms of the thermal emissivity of the plant. Thermal emissivity is defined as the ratio of the radiation emitted by a surface to the radiation emitted by a complete radiator or black body, at the same temperature and under similar conditions. Thus, a nearly perfect radiator may have an emissivity of 1, while materials which are less efficient radiators, radiating less infrared energy at the same temperature, have lower emissivity. Thus, for example, an emissivity of 0.8 indicates that a material would radiate only 80% of the infrared energy radiated by a black body.

The heat retention or thermal emissivity characteristics of grape vine 12 may be measured using a conventional infrared sensor moved horizontally across the plant. For example, if such a scan were carried out at the height indicated by arrows 20 in FIG. 1a (corresponding to arrows 20' of FIG. 1b) and the sensor output displayed on an oscilloscope, the result would be the display of FIG. 1c. As shown therein, the infrared sensor output determines the display vertical deflection, the extent of vertical displacement thus representing the thermal emissivity of the object being scanned. Distance along the abscissa corresponds to horizontal direction of the scanner.

Figures 1B, 1C:
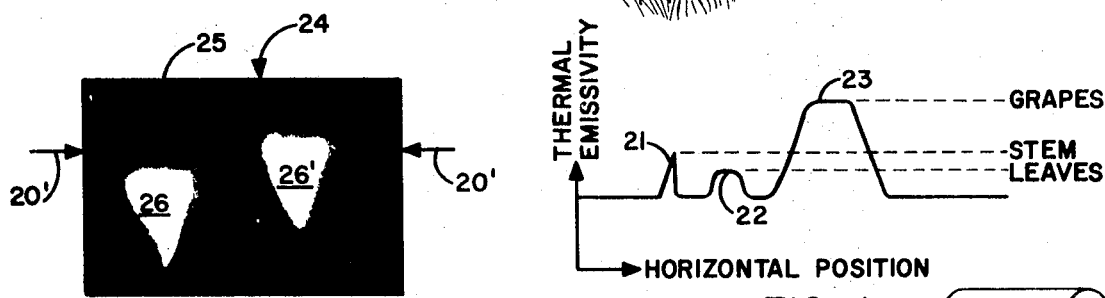

Note in FIG. 1c that the oscillograph has three main regions. Thus, the emissivity peak 21 corresponds to the lefthand stem 16 in FIG. 1a. The middle excursion 22 in FIG. 1c designates the thermal radiation from the leaves 17 intermediate the two grape clusters shown in FIG. 1a. The large vertical excursion 23 of the FIG. 1c display corresponds to the righthand grape cluster 15 of FIG. 1a. The curve of FIG. 1c clearly shows that in a grape plant, the fruit has the highest thermal emissivity, the stem region has somewhat lower thermal emissivity and the leaves have lower emissivity yet.

By scanning both horizontally and vertically across the grape vine 12 of FIG. 1a, and presenting the infrared sensor output on an oscilloscope, a raster type display 24 such as that shown in FIG. 1b may be obtained. FIG. 1b also represents the appearance of a photograph of grape vine 12 taken using infrared sensitive film.

To obtain display 24, the infrared detector minimum sensitivity was adjusted to a level greater than that corresponding to the thermal emissivity of stems 16 (see excursion 21 in FIG. 1c) but less than that corresponding to the thermal emissivity of grape clusters 15 (see excursion 23 in FIG. 1c). In this manner the black background 26 indicates the relatively low ambient infrared temperature, and the white regions 26 and 26' correspond respectively to adjacent grape clusters 15 and 15' in FIG. 1a.

The displays of FIGS. 1b and 1c were obtained by first heating grape vine 12 for approximately 20 seconds from an ordinary household heat lamp held about one foot away. The plant then was allowed to cool for approximately 10 seconds. A temperature difference of about 0.5° C. between stems 16 and grape clusters 15 then was noted. The difference corresponds to the distance along the ordinate in FIG. 1c between the thermal emissivity values for stem and grape cluster. Note that the grape need not be heated much above the environmental ambient temperature, thereby insuring that the grapes are not injured by the heating. While the actual temperature to which the grapes are heated depends on the sensitivity and response time of the infrared sensor used, typically the grapes need not be heated more than about 10° F. above ambient.

The thermal emissivity characteristics of a typical fruit-bearing plant permit simple and automatic detection of the location of fruits and stems in a vine- or tree-borne fruit plant, this technique being utilized in the present invention.

To accomplish severing of detected fruit, it has been discovered that the stems of most fruit can be cut using a very fine, high intensity stream of air or water. For example, when a solid stream of water is projected from a nozzle having an orifice diameter on the order of .02 inch, a typical grape stem can be severed from a distance of 2 feet using a minimum water pressure of 1200 p.s.i. Consistent cutting of such grape vines at distances of even greater than 2 feet can be achieved with solid streams of water on the order of 5000 p.s.i. projected from a nozzle having an orifice diameter of .05 inch or less. In addition, it has been found that grape stems can be severed using a fine stream of high pressure air or other gas. Typically, air under a pressure of 5000 p.s.i. projected from a nozzle having an orifice diameter of .02 inch will sever grape stems at a distance of 2 feet.

Figure 2:
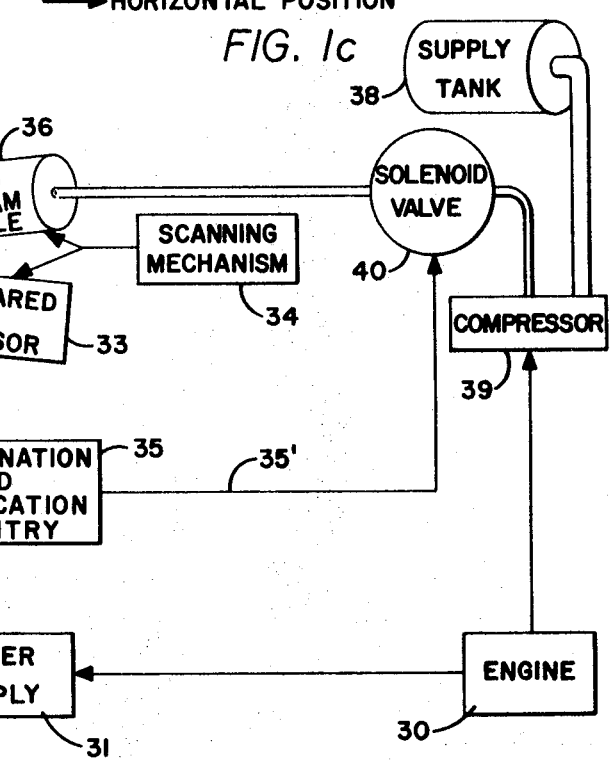
FIG. 2 is a somewhat schematic representation of a fruit harvesting apparatus in accordance with the present invention.

In FIG. 2 there is shown a block diagram of a complete fruit harvesting system in accordance with the present invention. The system utilizes infrared scanning to determine the location of the fruit, and employs a high pressure fluid stream cutter to accomplish severing of the fruit stem. The system may be mounted on a farm vehicle such as a tractor (not shown in FIG. 2) having an engine 30 which may be used to drive a suitable power supply 31 for the electrical components of the system. Power supply 31 may comprise a conventional generator or alternator. An electric heater 32, powered by supply 31, is used to preheat the fruit plant being harvested. Heater 32 may comprise an infrared lamp, a conventional coil type electric heater, or any other type of heater which lends itself to operation in a moving vehicle.

Location of the fruit is accomplished using a conventional infrared sensor 33. Such devices are well known to those skilled in the art, and are typified by the infrared sensor described in the Philco-Ford Corporation "Applications Handbook, Sierra Model 710B Infrared Scanner." Infrared sensor 33 may be directed to perform a linear or raster-type scan across the fruit plant being harvested, under control of an appropriate scanning mechanism 34. In one embodiment, scanning mechanism 34 may comprise an electromechanical assembly such as that shown in FIG. 4 for causing sensor 33 to reciprocate vertically and/or horizontally across the region of the plant which previously has been heated by heater 32.

The electrical output of infrared sensor 33 is supplied to conventional discrimination and amplification circuitry 35, which circuitry provides an output along line 35' when an object having emissivity above a certain preselected level is detected by sensor 33. For example, discrimination and amplification circuitry 35 may be adjusted to provide an output only when the detected emissivity level corresponds to that indicative of a grape cluster. Under those circumstances as output will appear on line 35' only when thermal radiation greater than that represented by the height of excursion 21 (in the oscillogram of FIG. 1b) is detected.

Actual severing of grape stem 16 is accomplished using a high intensity fluid cutter of the type described. Thus, in FIG. 2 the cutter comprises a nozzle 36 of a type commercially available for producing a "0°" solid stream 37 of water or air, the nozzle having an orifice with a diameter of less than about .05 inch. Typically, fluid may be supplied to nozzle 36 from a tank 38 and a compressor 39 (driven by engine 30) via a solenoid actuated valve 40.

Nozzle 36 is appropriately mounted so as to move in tandem with infrared sensor 33 under control of scanning mechanism 34. In this manner, the stream 37 of fluid projecting from nozzle 36 may be aimed to impinge at a point displaced slightly above the corresponding location scanned by infrared sensor 33. This displacement may be adjusted so that when infrared sensor 33 scans across the center of a cluster 15 of grapes, the cutting stream 37 from nozzle 36 will be directed to strike the stem 16 supporting the cluster.

With the system just described, when sensor 33 detects cluster 15, an output will be obtained along line 35' causing actuation of valve 40. Water or other fluid from compressor 39 will be suppled to niozzle 37, forming high intensity cutting stream 37. As sensor 33 scans across the grape cluster, high intensity stream 37 will sever stem 16, permitting the grape cluster to fall into an appropriate catch mechanism.

FIG. 3 illustrates how the inventive harvesting system of FIG. 2 may be incorporated on a conventional farm tractor for actual grape picking operation. For simplicity of exposition, the system is shown in FIG. 3 in use with a trellis system of the inverted-L-type; however, this is not a requirement and the inventive system may be used with any type of trellis.

As shown in FIG. 3, the inverted-L trellis system comprises a plurality of vertical stakes 41 arranged in a row. Extending horizontally from the upper end of stakes 41 are a like plurality of wire supports 42, appropriately braced with cross pieces 43. A plurality of trellis wires 44 and 45 extend between supports 42. In the trellis system shown, grape vines 12 have their trunks 13 adjacent stakes 41, the fruit-bearing canes 14 extending along the inner trellis wire 45, the non-fruit-bearing shoots or vines 18 extending downward from the outer trellis wire 44.

Still referring to FIG. 3, note the inventive harvester is mounted on a tractor 50 which has been modified only insofar as required to provide physical support for the various components of the system.

Tractor 50 is provided with a chute 51 having a scoop portion 51a at its forward end, an inclined portion 51b and a horizontal elevated portion 51c. The purpose of chute 51 is to catch the non-fruit-bearing vines 18 and to lift these up and out of the way of the fruit sensing and cutting mechanisms during the harvesting operation. Such operation may not be required, if appropriate discrimination can be achieved with the particular infrared sensor employed so as to locate the grape clusters despite the intermittent presence of vines 18 between the sensor and the clusters.

Still referring to FIG. 3, a heater 32' (corresponding to heater 32 of FIG. 2) is mounted toward the forward end of tractor 50 by means of a rigid support 52. Heater 32' is maintained in a position facing the fruit to be harvested. Mounted rearwardly of heater 32', and on the same side of tractor 50, is an appropriate infrared sensor 33' and a cutting nozzle 36', these components corresponding respectively to sensor 33 and nozzle 36 of FIG. 2. The horizontal separation between heater 32' and sensor 33' should be sufficient to permit the fruit heated by heater 32' to cool down somewhat before sensor 33' scans the fruit. The preferred separation between heater 32' and sensor 33' will be selected empirically and will depend on several factors, including the speed at which tractor 50 is to be operated, the amount of heat produced by heater 32', the type of fruit or berries being picked, the distance of tractor 50 from the trellis, and the sensitivity and response time of sensor 33'.

Sensor 33' and nozzle 36' are mounted on a support 54 (FIG. 3), appropriately designed to facilitate simultaneous horizontal and/or vertical scanning of these components. A wide variety of scanning mechanisms may be employed with the inventive system, an illustrative mechanism being described hereinbelow in conjunction with FIG. 4.

Tractor 50 also may be provided with an appropriate housing 55 for the electronic circuitry associated with sensor 33'. Housing 55 also may contain the solenoid valve 40 (FIG. 2) used to control the flow of fluid from a compressor 39' to nozzle 36' in response to the thermal emissivity measured by sensor 33'. A fluid supply tank 38' also may be mounted on tractor 50.

Tractor 50 also is provided with an appropriate apparatus for collecting grape clusters 15 as they drop from trellis 44. In the embodiment shown, this apparatus comprises a conveyor 57 mounted to tractor 50 by appropriate brackets 58. Preferably, endless conveyor belt 59 is driven via the transmission of tractor 50 so that the upper surface of belt 59 moves backward at a speed equal to the forward speed of tractor 50. In this way, the relative speed of the upper surface of belt 59 with respect to the ground is zero. Thus, as the grapes drop, they are not accelerated horizontally and hence suffer minimum damage. Conveyor 57 may discharge the grapes into any appropriate collection means.

One illustrative form of mounting and scanning mechanism for infrared sensor 33' and solid stream cutter nozzle 36' is shown in FIG. 4. Referring now to FIG. 4, support mechanism 54' (corresponding to support mechanism 54 in FIG. 3) comprises a generally cylindrical member 60 disposed in a vertical plane, and supported between apropriate upper and lower bearings 61 and 62. Bearings 61 and 62 themselves are fixedly mounted to tractor 50 by means of horizontal brackets 63 and 64, respectively. Cylindrical member 60 is free to move both longitudinally (i.e. up and down) and rotationally (i.e. about its longitudinal axis) with respect to bearings 61 and 62. Cylindrical member 60 is connected coaxially at its lower end to a shaft 65 associated with a conventional hydraulic cylinder 66. Operation of hydraulic cylinder 66 is directed by a control mechanism 67 shown schematically in FIG. 4 and described more fully hereinbelow. Hydraulic cylinder 66 is used to reciprocate cylindrical member 60 longitudinally.

The lower portion of cylindrical member 60 is provided with a longitudinal slot or keyway 68. Surrounding a portion of rod 60 adjacent its lower end, and supported by bearing 62 (see FIG. 4) is a lever arm 69. Lever 69 is provided at one end with a slotted opening 70 in surrounding relationship to shaft 60, a key 70' in opening 70 engaging keyway 68. Cylindrical member 60 is free to move horizontally with respect to lever arm 69, but because of the cooperation of key 70' and keyway 68, member 60 can only rotate in unison with lever 69. The other end 71 of lever arm 69 is pivotally attached to the end of a shaft 72 associated with a second hydraulic cylinder 73 which also is operated by control mechanism 67. It will be appreciated that by actuating hydraulic cylinder 73, shaft 72 may be made to move in a horizontal plane, thereby moving lever arm 69 and causing concomitant angular displacement of cylindrical member 60 about its axis.

Nozzle 36′ and infrared sensor 33′ are fixedly attached to cylindrical member 60 by appropriate mounting brackets 74 and 75.

Control mechanism 67 may comprise conventional electromechanical devices for directing the flow of hydraulic fluid to cylinders 66 and 73 in a programmed fashion. For example, cylinder 73 may be directed to reciprocate at a substantially constant rate, thereby causing cylindrical member 60 to rotate back and forth about its axis through a preselected arc at a corresponding rate. This rotational motion causes horizontal scanning of sensor 33′. Simultaneously, hydraulic cylinder 66 may be controlled to cause linear vertical displacement of cylindrical member 60 at a rate proportional to that at which member 60 is being rotated. This linear motion causes vertical scanning of sensor 33′.

In a preferred mode of control, hydraulic cylinder 66 may be operated to displace cylindrical member 60 rapidly to its uppermost extreme, preferably within a fraction of the time required for one angular reciprocation of sensor 33′. Then, cylinder 66 may be controlled to permit cylindrical member 60 to move downward at a rate sufficiently slow so that many angular reciprocations are completed by scanner 33′ in the time required for member 60 to drop from its uppermost to its lowest position.

Such an arrangement, cooperating with the forward motion of tractor 50, results in a raster type scan pattern across the vines being picked. Thus, as cylindrical member 60 moves downward from its uppermost level, infrared sensor 33′ is scanning back and forth across a region of the grape vine. Preferably, in the time required for cylindrical member 60 to complete its downward motion, tractor 50 has moved forward by an amount equal to the horizontal distance covered by a single horizontal reciprocation of sensor 33′. Thus, after cylindrical member 60 has been returned rapidly to its uppermost position, the next downward scan will cover a new region of the grape vine immediately adjacent the region covered on the previous scan.

By scanning downward, sensor 33′ first will sense the upper portion of a cluster of grapes. When this occurs, solenoid valve 40 will be actuated, causing nozzle 36′ to project a cutting fluid stream to a point just above the sensed cluster portion. By appropriately spacing sensor 33′ and nozzle 36′ on cylindrical member 60, this cutter stream will be directed toward the stem of the sensed grape cluster. Since cylindrical member 60 is reciprocating about its axis, the cutting stream similarly will move across the stem region, cleanly severing the stem. The grape cluster then will drop, for example, onto conveyor belt 59 (FIG. 3). The severed grape cluster will no longer appear in the field of view of sensor 33′, thus closing valve 40 until the next cluster of grapes is located.

As an alternative to the single solid stream nozzle and solenoid valve illustrated in FIGS. 2, 3 and 4, a plurality of such nozzles and valves may be used. For example, a plurality of cutter nozzles may be fixedly mounted to tractor 50, each nozzle aimed at a slightly different angular position with respect to the tractor. Then when sensor 33′ detects a fruit cluster, circuitry cooperating with the scanning mechanism would actuate only the solenoid valve associated with that nozzle pointed in the direction presently being scanned by sensor 33′. In this way, selective cutting may be achieved even without requiring that the cutter nozzle be scanned simultaneously with sensor 33′.

Obviously, collection devices other than the illustrated conveyor may be used to collect fruit located and severed in accordance with the present invention. For example, when picking grapes from a conventional trellis, the tractor may be provided with a catch bin mounted to retract toward the tractor when a trellis stake is detected, and to return to an extended position under the trellis wire when the stake has been passed. Alternatively, a plurality of flat, swinging arms may be used to catch the fruit, the arms pivoting out of the way to clear trellis stakes.

Various types of infrared detectors may be employed in the inventive harvester system, including but not limited to those of the thermistor, radiometer and bolometer types. Liquid nitrogen cooled detectors may be employed, these typically providing temperature resolution of 0.5° C. at 30° C., with a response time on the order of 10 microseconds.

While the cutter mechanism depicted herein is of the fluid stream type, other fruit severing devices may be employed. For example, a laser cutting beam may be used, the beam being turned on and pointed in response to thermal detection of fruit.

Further, while the invention has been described herein in conjunction with grape picking, the harvester system is not so limited, and may be used to pick any vine or tree borne fruit or berry, whether or not grown in a network of trellises. For example, citrus trees may be harvested by scanning the thermal sensor and cutter nozzle about the outer perimeter of the tree. Alternatively, with umbrella-shaped fruit trees such as avocado and peach, the thermal scanning may be performed from under the tree, for example by scanning in a circle about the trunk. The inventive system also may be employed to harvest tomatoes, melons, or any other fruit or vegetable.

While the invention has been described with respect to several physical embodiments constructed in accordance therewith, it will be apparent to those skilled in the art that various modifications and improvements may be made without departing from the scope and spirit of the invention.

We claim:

1. A fruit harvester comprising:
   sensor means for detecting the amount of heat retained by portions of a fruit bearing plant, regions of maximum heat retention indicating the location of fruit, and
   cutter means for selectively severing said located fruit from said plant, said cutter means being actuated in response to location of said fruit by said sensor means.

2. A fruit harvester according to claim 1 further comprising:
   means for preheating said plant to slightly above ambient temperature.

3. A fruit harvester according to claim 1 wherein said cutter means comprises a nozzle and means for supplying a fluid under pressure to said nozzle, thereby producing from said nozzle a high intensity stream of said fluid.

4. A fruit harvester according to claim 3 further comprising a valve for controlling the supply of said fluid to said nozzle, said valve being actuated in response to location of said fruit by said sensor means.

5. A fruit harvester according to claim 3 wherein said nozzle has an orifice diameter of less than .05 inch, and wherein said fluid comprises one of air or water.

6. A fruit harvester according to claim 5 wherein said fluid comprises water having a pressure of at least 1200 pounds per square inch.

7. A fruit harvester according to claim 5 and comprising a plurality of said nozzles pointing in different directions, and valve means responsive to said sensor means for selectively supplying fluid to the nozzle pointing most closely toward said located fruit.

8. A fruit harvester comprising sensor means for detecting heat retained by portions of a fruit bearing plant, said sensor means comprising an infrared sensor and circuitry means cooperating therewith for discriminating between sensed thermal emission levels indicative of fruit and levels indicative of other plant tissue and for providing an output signal indicative of fruit detection.

9. A fruit harvester according to claim 8 further comprising:
   scanning means for causing said infrared sensor to scan said plant.

10. A fruit harvester according to claim 8 comprising: cutter means for selectively severing said located fruit from said plant, said cutter means being actuated in response to said output signal.

11. A fruit harvester according to claim 10 wherein said cutter means comprises a nozzle having an orifice diameter of less than .05 inch and means for supplying water having a pressure of at least 1200 pounds per square inch to said orifice, thereby producing from said nozzle a high intensity stream of water capable of severing a fruit stem.

12. A fruit harvester according to claim 11 further comprising a solenoid valve for controlling the supply of water to said nozzle, said solenoid valve being actuated in response to said output signal.

13. A fruit harvester according to claim 10 further comprising:
scanning means for causing said infrared sensor and said cutter means simultaneously to scan said plant.

14. A fruit harvester according to claim 13 wherein said scanning means comprises means for providing simultaneous vertical and horizontal scanning of said sensor and said nozzle.

15. A fruit harvester as defined in claim 10 further comprising:
means for retrieving fruit severed from said plant.

16. A fruit harvester as defined in claim 1 wherein said cutter means comprises a laser.

17. A fruit harvester according to claim 10 wherein said cutter means comprises a laser.

18. A grape harvester carried by a farm vehicle, said harvester comprising:
a heater mounted toward the forward end of said vehicle and adapted to heat portions of a grape vine to a temperature slightly above ambient,
infrared sensor means, mounted on said vehicle rearward of said heater, for detecting regions of maximum thermal emissivity in said grape vine, said regions indicating the location of grape clusters, and
cutter means, actuated by said sensor means in response to detection of a region of maximum thermal emissivity, for severing said located grape cluster from said grape vine.

19. A grape harvester as defined in claim 18 further comprising:
means for scanning said sensor across a portion of said grape vine previously heated by said heater, and
means for retrieving said severed grape clusters.

20. A grape harvester as defined in claim 19 wherein said cutter means comprises:
a source of water under pressure,
a nozzle capable of producing a solid stream, said nozzle scanning in unison with said sensor, and
means for supplying said water under pressure to said nozzle in response to detection of a region of maximum thermal emissivity, whereby the resultant solid stream of water severs the stem of said located grape cluster.

21. A grape harvester as defined in claim 20 further comprising:
chute means for removing non-fruit-bearing vines from between said sensor and said grape clusters.

22. A grape harvester as defined in claim 19 further comprising:
a plurality of nozzles mounted on said vehicle and pointed in different directions toward said grape vine,
a source of water and a compressor for pressuring said water, and
means responsive to location of a grape cluster by said sensor means for supplying said water under pressure selectively to that nozzle pointing most closely toward said detected grape cluster, the resultant high intensity water stream from said nozzle severing said located grape cluster from said grape vine.

23. A method of harvesting fruit from a plant, comprising the steps of:
electronically locating said fruit by infrared sensing the difference in thermal retention between said fruit and the other portions of said plant, and
selectively automatically severing said electronically located fruit from said plant.

24. The fruit harvesting method defined in claim 23 further comprising the initial step of preheating said plant to slightly above ambient temperature, and the final step of conveying away said severed fruit.

25. The fruit harvesting method defined in claim 23 wherein said severing step comprises actuating a high intensity fluid stream toward said fruit in response to location thereof, said stream selectively severing said located fruit from said plant.

26. A method for automatically harvesting vine-borne fruit clusters from vines trained in a vineyard in rows over horizontal wire trellises so that the fruit clusters hang down below said wires while non-fruit-bearing shoots extend out beyond the trellises and hang down toward the ground, comprising the successive and continuously performed step of: lifting said non-fruit-bearing shoots to an elevated position; electronically locating the fruit cluster by sensing the differential thermal emissivity thereof; cutting off the cluster with cutter means directed and actuated in response to said electronic location; and conveying the cut clusters away as soon as they drop from the vine; said operations of lifting, locating, cutting, and conveying being carried out substantially continuously on a movable conevyance which substantially continuously advances through said vineyard.

References Cited

UNITED STATES PATENTS

| | | | |
|---|---|---|---|
| 2,088,676 | 8/1937 | White | 56—14 |
| 2,893,194 | 7/1959 | Lamouria | 56—331 |
| 2,978,856 | 4/1961 | Cook | 56—229X |
| 3,147,384 | 9/1964 | Fenton | 250—83.3(IRX) |
| 3,462,602 | 8/1969 | Apple | 250—83.3 |
| 3,517,578 | 6/1970 | Krofta | 83—177 |

ROBERT PESHOCK, Primary Examiner